Nov. 4, 1969　　　E. TIGER ETAL　　　3,476,479
ELECTROPHOTOGRAPHIC COPYING MACHINE
Original Filed Nov. 12, 1964　　　3 Sheets-Sheet 1

INVENTOR.
Emil Tiger
Erskine G. Corman
Kenneth R. Reick

ATTORNEYS

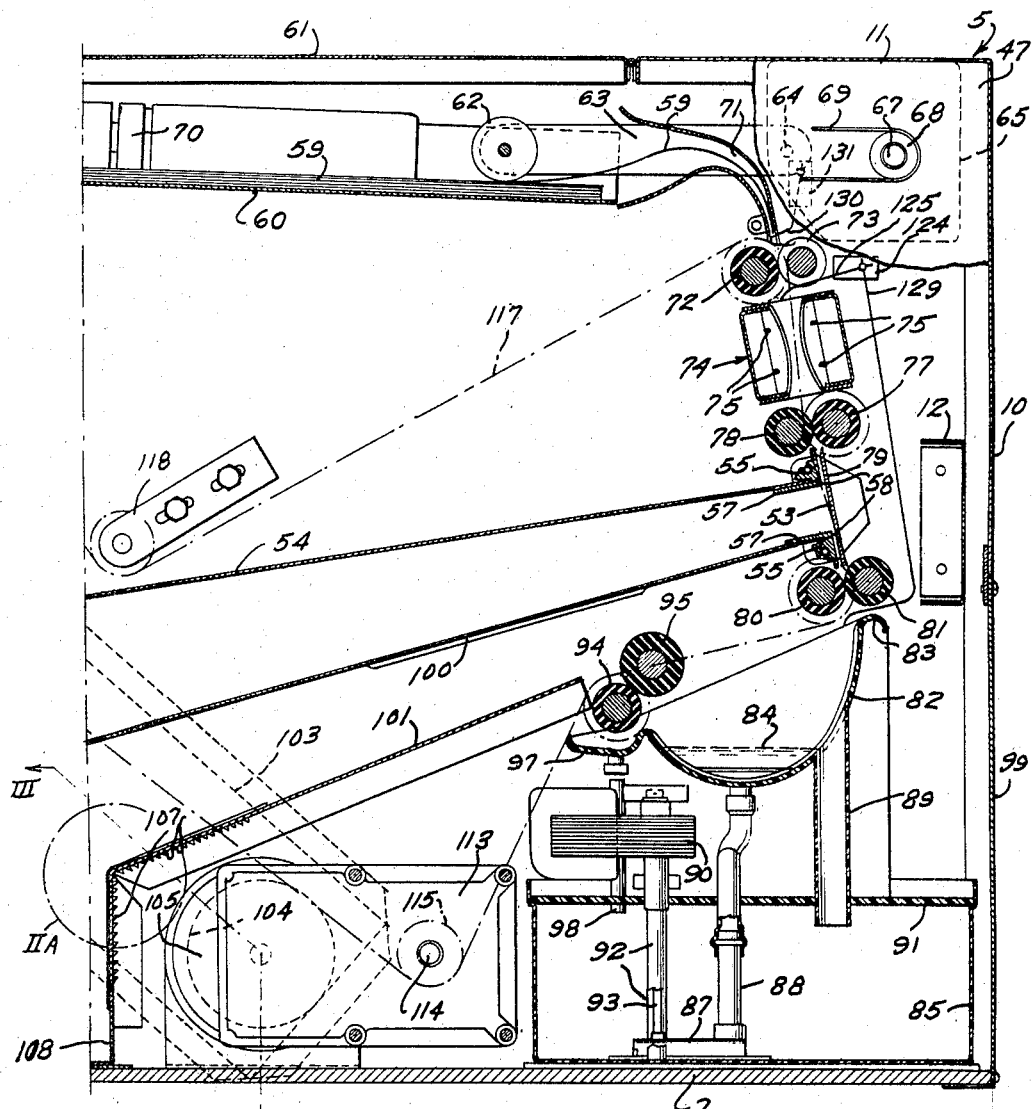

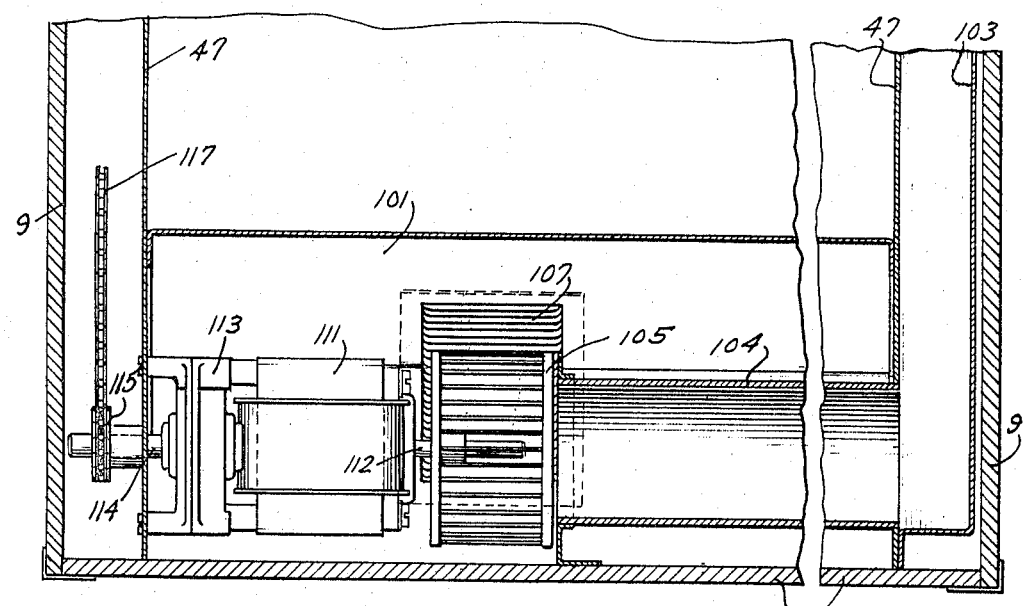
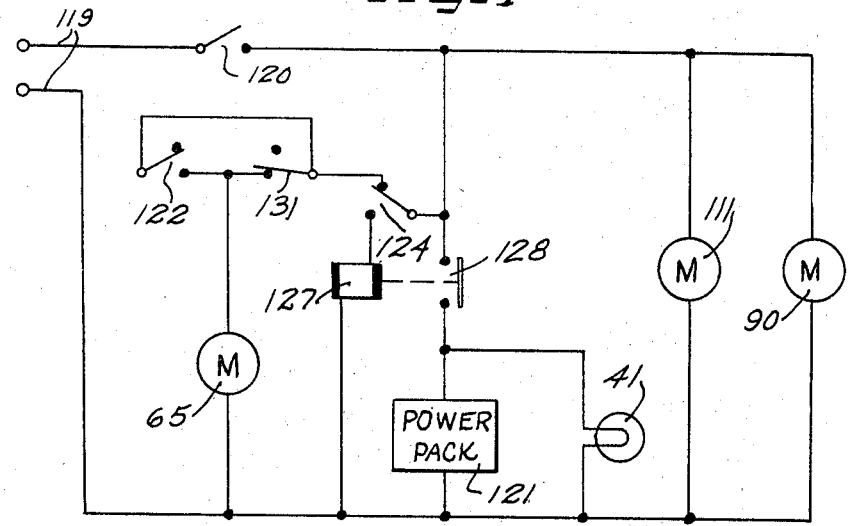

United States Patent Office 3,476,479
Patented Nov. 4, 1969

3,476,479
ELECTROPHOTOGRAPHIC COPYING MACHINE
Emil Tiger, Highland Park, Erskine G. Corman, Forest Park, and Kenneth R. Reick, Downers Grove, Ill., assignors to Sunbeam Business Equipment Co., Addison, Ill., a corporation of Illinois
Original application Nov. 12, 1964, Ser. No. 410,549, now Patent No. 3,345,926, dated Oct. 10, 1967. Divided and this application Sept. 5, 1967, Ser. No. 665,447
Int. Cl. G03b 27/32, 27/52
U.S. Cl. 355—64    10 Claims

ABSTRACT OF THE DISCLOSURE

A copy making machine which has document transport and scanning means, a copy sheet magazine, copy sheet transport and exposure means spaced from the magazine, means for transferring a document image from the scanning means to the exposure means and means for guiding copy sheets from the magazine to the copy sheet transport means, has means including a drive motor for feeding copy sheets from the magazine and a motor-operating electrical circuit with a control switch actuated by the leading edge of each copy sheet to stop the motor and thus feeding of the sheet just short of the transport means. The circuit includes a shunt around the switch to the motor, and a normally open switch in the circuit is closed to close the shunt and activate the motor for concurrent driving of the copy sheet through the exposure means with travel of the document through the scanning means. There is also control switch means operated by the copy sheet for controlling illumination of the exposure aperture. In the aperture structure, combination bracket and frame pieces have slots therein for mounting light-shielding panels. Such frame pieces may have reflecting surfaces thereon to reflect into the aperture light from the illuminating means which would otherwise spread beyond the aperture. The bracket frame pieces may comprise extruded bars.

---

This application is a division of our copending application, Ser. No. 410,549, filed Nov. 12, 1964, now Patent No. 3,345,926, issued Oct. 10, 1967.

This invention relates to improvements in copying machines and more particularly concerns such machines of small, compact generally desk model size and in the present instance of the type employing a liquid developer.

Among the important objects of the present invention is to provide a new and improved copying machine of simplified compact, rugged and efficient construction arranged to produce high quality copies automatically and at high speed.

Another object of the invention is to provide new and improved document scanning and copy paper exposure aperture means for copying machines.

A further object of the invention is to provide new and improved copy paper feeding means for machines of this character.

A still further object of the invention is to provide new and improved copy paper feed and control means in a copying machine.

Other objects, features and advantages of the present invention will be readily apparent from the following detailed description of a preferred embodiment thereof taken in conjunction with the accompanying drawings, in which:

FIGURE 2 is a continuation of FIGURE 1 showing the rear portion of the machine;

FIGURE 2A is an enlarged fragmentary detail view of that portion of FIGURE 2 indicated by the circle IIA;

FIGURE 3 is a sectional elevational detail view taken substantially on the line III—III of FIGURE 2; and FIGURE 4 is an electrical diagram of the control circuitry of the machine.

Figure 1:
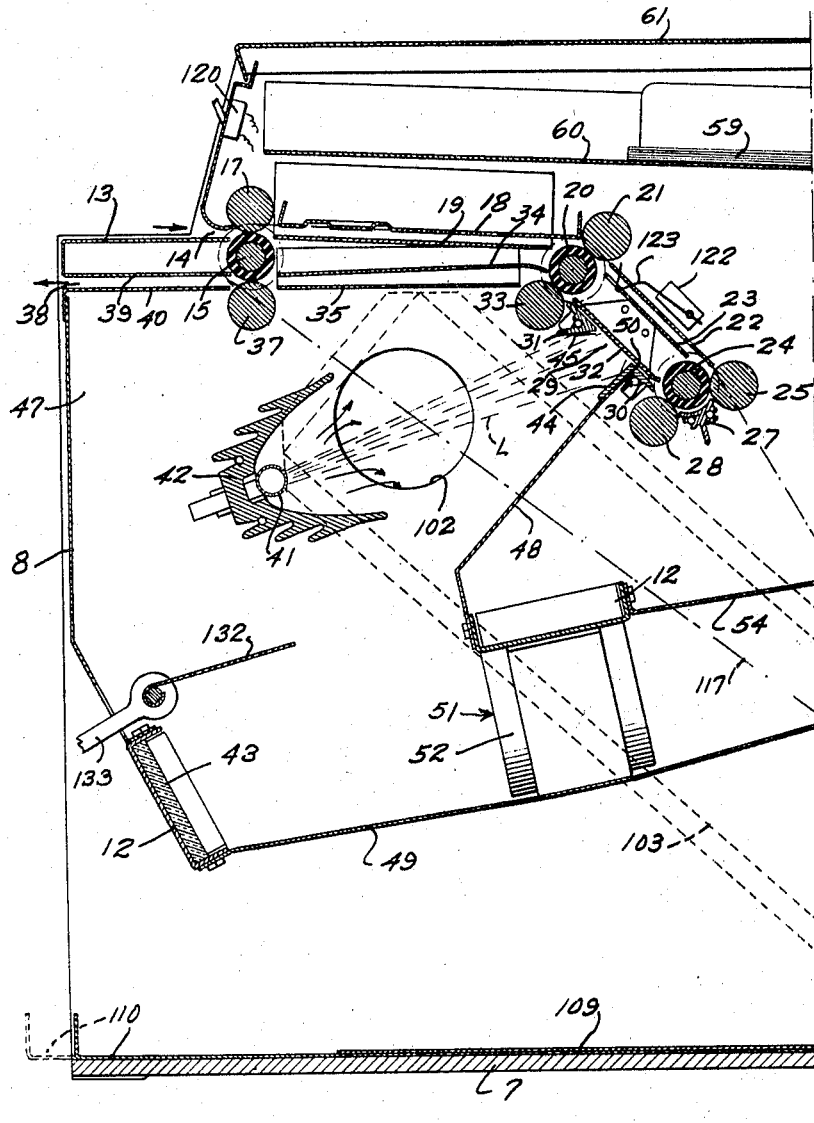
FIGURE 1 is a vertical longitudinal sectional elevational schematic view through the front portion of a machine embodying features of the invention.

An enclosing cabinet 5 houses the machine and includes a base wall 7, a front wall 8, respective opposite side walls 9, a rear wall 10 and a top wall 11. Within the housing suitable reinforcing and supporting frame structure is provided including various transverse frame bar 12.

In the front upper portion of the housing 5 are provided means for scanning a document original to be copied. For this purpose, the front wall 8 is inset a short distance adjacent to the top of the cabinet and an upwardly facing receiving ledge 13 is provided on which documents are hand fed into a receiving throat 14 leading to the nip of a driven feed roller 15 and a coacting idler roller 17 by which the document is fed rearwardly through a guide passage between narrowly spaced upper and lower passage plates 18 and 19 which guide the document to the nip of a second driven feed roller 20 and a coacting idler roller 21 set to divert the infed document diagonally downwardly and rearwardly through a passage defined by an upper guide plate 22 and a closely adjacently spaced lower guide plate 23 leading the advancing document into the nip of a driven feed roller 24 and an idler roller 25 set to bend the leading edge of the document to travel about the driven roller 24 as guided by a semicylindrical closely spaced guide bracket 27. Thence, the leading edge of the document passes into the nip of the driven roller 24 and an idler roller 28 by which the document is directed diagonally upwardly and forwardly in reverse to the passage between the plates 22 and 23 and parallel thereto past a scanning aperture 29 defined by a lower document guiding and aperture bracket 30 and an upper spaced document guiding and aperture bracket 31. Cooperative in document guiding relation with the brackets 30 and 31 is a guide and backing plate 32 which extends across the scanning aperture 29 and affords an opaque backing for the document. Improved definition of the documentary material on the scanned face of the document is attained by having the surface of the plate 32 which faces into the aperture 29 of substantially white color as by means of a suitable coating on the surface, where the material of the plate 32 is not naturally of a substantially white color.

Beyond the guide bracket 31, the document is guided into the nip of the driven roller 20 and a cooperating idler roller 33 from which the document is guided into a substantially horizontal plane forwardly by an upper guide plate 34 and a lower guide plate 35 defining a guide passage therewith leading to the nip of the driven roller 15 and a lower idler feed roller 37 by which the copied document is delivered into and through an exit passage 38 defined between spaced upper and lower plates 39 and 40 and located adjacently below the infeed or entry ledge 13 in the uppermost front portion of the cabinet. Thus, the document makes its entire transport circuit in substantially parallel intravelling and outtravelling legs of a path in which both the intravelling and outtravelling motivation is afforded by the three driven rollers 15, 20 and 24.

Illumination of the document as it passes the scanning aperture 29 is effected by means comprising a high intensity tubular lamp 41 mounted within a channel-shaped parabolic reflector 42 located below the horizontal portions of the document transport system and projecting into the scanning aperture above a reflection path from the aperture to a scanning mirror 43 mounted on one of the cross bars 12 below and forwardly relative to the reflector 42.

As indicated schematically by light ray lines L, concentration of scanning illumination of the exposed portion of the document as it passes across the aperture 29 is enhanced by reflecting into the aperture light rays which would otherwise be lost by spreading beyond the effective area of the aperture. For this purpose, reflecting surfaces are provided at least along each longitudinal edge defining the aperture. Such reflecting surfaces are conveniently and efficiently provided by respective flanges 44 and 45 on the brackets 30 and 31, respectively. For maximum light gathering and concentrating effect, the reflecting surfaces of the flanges 44 and 45 are divergently related to one another and to the axis from the center of the lamp 41 to the center of the scanning aperture 29. Further, the planes of the respective reflecting faces of the flanges 44 and 45 if projected pass outside of the longitudinal edges of the reflecting surface within the transversely elongated reflector 42. Additionally, of course, the planes of the reflecting surfaces of the flanges 44 and 45 are at a proper angle relative to the lamp 41 to reflect light rays from the lamp into the aperture 29.

Light shielding of the scanning area is afforded by the front wall 8, the document guide passage panels 35 and 40 at the top, by respective opposite vertical side panels 47, a rear shielding panel 48 and a bottom shielding panel 49. At its lower end, the front wall 8 is attached to the front cross bar 12 on which the reflecting mirror 43 of the scanning optical system is mounted and which bar is spaced substantially above the bottom wall 7. Attachment of the front end of the bottom shielding panel 49 is also to the front transverse frame bar 12.

Attachment of the upper edge of the rear shielding panel 48 is to the aperture and reflector bracket 30 which, for this purpose, is provided with a longitudinal downwardly and forwardly opening groove 50 alongside the flange 44 and into which the edge portion of the panel 48 is fitted. At its lower end, the panel 48 is attached to the adjacent transverse frame bar 12 which is located in rearwardly spaced relation to the mirror 43 and in upwardly spaced relation to the bottom shielding panel 49.

Between the bottom panel 49 and the overlying spaced frame bar 12 is mounted a lens supporting bracket structure 51 carrying image projecting lens means comprising an assembly including a barrel 52 and aligned for receiving from the scanning mirror 43 the image of the document passing the illuminated scanning aperture 29 and focusing such image generally rearwardly and in this instance slightly upwardly into an exposure aperture 53 located in about the center of the rear portion of the chamber within the cabinet housing 5. Means providing a projection tunnel from the lens or objective assembly 52 to the exposure aperture 53 comprise a rearward extension of the lower panel 49 and an upper tunnel panel 54 having its forward end attached to the transverse frame bar 12 contiguous to the lens assembly.

Supporting the rear ends of the tunnel-forming extension of the lower panel 49 and of the tunnel panel 54 are transverse parallel, coextensive spaced exposure aperture defining bracket members 55 which are desirably constructed identically as the scanning aperture defining and panel supporting bracket 30, whereby to afford standardization of parts. Each of these brackets may be constructed as an extruded bar, either metallic or nonmetallic as preferred. Similarly as the bracket bar 30, the bracket bars 55 have aperture-defining respective flanges 57 and alongside such flanges respective panel-receiving grooves 58 within which the adjacent edge portions of respectively the tunnel-defining panels 49 and 54 are engaged.

Means are provided for supplying and feeding successive copy sheets 59 to pass through the exposure aperture 53 in synchronized relation with passage of a document to be copied through the scanning aperture 29. To this end, a copy sheet magazine including a magazine receptacle 60 is mounted in the housing 5 above the document transport assembly and extending rearwardly under the top wall 11 to a suitable position rearwardly above the projection tunnel and the exposure aperture 53. Access into the copy sheet supply magazine is conveniently through a hinged cover 61 forming part of the top wall.

Feeding of successive copy sheets from a stack in the magazine receptacle 60 is effected by means of a frictional feed roller 62 which lies on top of the rear portion of the stack and is carried by one or more arms 63 of a pivotally mounted roller supporting frame pivoted at its rear end portion on a horizontal axis pivot 64. Thereby, the feed roller 62 lies in freely descending, downwardly thrusting relation on the copy sheet stack for gravitationally pressing against and feedingly gripping the uppermost of the copy sheets.

Means for driving the feed roller 62 comprise a simple, inexpensive electrical motor 65 conveniently mounted under the rear portion of the top wall 11 and alongside the right-hand inner housing vertical frame panel 47 and having a drive shaft 67. Means for coupling the drive shaft 67 with the feed roller 62 comprise a drive pulley 68 mounted on the drive shaft and having trained thereover a flexible driving element such as an endless driving belt 69 which is also trained over a similar driving pulley (not shown) carried corotatively by one end portion of the roller 62 and more particularly its shaft by which the roller is journalled on its pivotal carrying bracket. Since the feed roller 62 is driven counterclockwise as viewed in FIGURE 2, with its direction of rotation thus downwardly and rearwardly, the driving torque thereon supplements gravitational downward thrust of the feed roller 62 for firm positive gripping and feeding of each successive copy sheet. Yet, the feeding thrust is not excessive, so that the topmost sheet can freely slide off of the next succeeding sheet. In addition to stack resistance to feeding of multiple sheets, adjustable side gripping means 70 may be providede to engage the sides of the stack of sheets in the magazine.

From the magazine 60, each of the copy sheets 59 is directed into a converging guide throat 71 extending rearwardly and then downwardly to guide the fed copy sheet into a plane past the exposure aperture 53. At the lower end of the guide throat the copy sheet is directed to the nip of a driven feed roller 72 and a coacting idler roller 73 which then assume onward feeding transportation of the copy sheet.

For electrophotographic copying, the copy sheets 59 are of the electrophotographic type such as a paper backing having a photosensitive coating comprising zinc oxide or the like plus a binder. Such material is adapted to take an electrostatic charge on passing through a charging device 74 including corona discharge wires 75 loaded alongside and across the path of travel of the copy sheet, and preferably on both sides of such path. This corona charging device 74 is located as close as practicable to the downstream side of the feed rollers 72, 73 and adjacent to the upstream side of a set of feed rollers comprising a driven roller 77 and a coacting idler roller 78 to the dielectric nip of which the charged copy sheet is fed from the charging device. Immediately following the feed rollers 78 and 77, the charged copy sheet passes the exposure aperture 53 with the sensitized surface of the sheet exposed aperture 53 with the sensitized surface of the sheet exposed to the image projected from the scanned document concurrently passing the scanning aperture 29. Backing the coply sheet across the aperture 53 is a plate 79 cooperating in appropriately spaced relation with the aperture-defining brackets 55 to provide a passage and guide for the sheet. Immediately on leaving the exposure aperture guide passage, the exposed sheet is engaged by a set of dielectric transport rollers comprising a driven roller 80 and a coacting idler roller 81.

Immediately on leaving the transport rollers 80 and 81, the exposed sheet is transported through image developing and fixing means comprising a receptacle 82 in the form of a trough-like tray opening upwardly and having an elevated rear curved lead-in edge 83 adjacent to the discharge side of the rollers 80 and 81. Within the developer tray 82, the copy paper is guided in an arcuate path downwardly and forwardly and then generally upwardly and forwardly and passes through a developer bath 84 comprising a suitable liquid vehicle and toner or developer particles. This developer bath or solution is maintained in constant circulation from a supply tank 85 below the tray 82 and from the bottom of which the solution is pumped by a pump unit 87 through a riser duct 88 into the bottom of the tray and returns through an overflow duct 89 leading from the tray into the tank. Driving of the pump unit 87 is by a pump motor 90 which may be conveniently mounted above a top cover 91 for the tank 85 on posts 92 and has a drive shaft 93 extending down into driving relation with the pump unit 87.

On leaving the toner bath 84, the developed copy sheet is directed by the curved guide wall of the tray 82 into the nip of transport and squeeze rollers comprising a driven roller 94 and a coacting idler roller 95 by which the surplus solution is squeezed from the copy sheet and the sheet is transported away from the developer tray. Solution squeezed from the sheet is received in a drip trough 97 under the roller 94 and comprising a forward extension on the tray 82. A drain duct 98 returns collected solution from the trough 97 into the tank 85. Access to the developer tank and tray assembly may be had through the back wall 10 of the housing through a removable panel or door 99.

On leaving the squeezing and transport rollers 94, 95 the still damp and now fully developed copy sheet is propelled generally forwardly and is deflected downwardly and forwardly by the overlying tunnel extension of the shield 49 which is desirably provided with longitudinal downwardly projecting spacer ribs 100 to avoid possible adherence of the damp copy sheet thereto. Underlying the path of movement of the copy sheet as discharged from the rollers 94 and 95 is a downwardly and forwardly extending guide plate 101 providing a discharge chute leading to a receiving area in the lower forward portion of the housing between the bottom wall 7 and the top side of the chute provided by the downwardly facing wall of the light tunnel, herein the shield panel 49, and readily accessible at the front of the machine below the mirror 43 for removal of the finished copies.

Means are provided for accelerating movement of the discharged copy sheets down the ramp into the receiving hopper and for simultaneously drying the damp sheets. In a highly desirable manner, this is effected by providing an air cushion under the sheets as they travel down the chute or ramp 101 whereby to effect an anti-friction air layer under the sheets to float the sheets into the receiving hopper. For accelerating drying of the sheet such air is desirably heated. Economically, the source of waste heat created by the scanning lamp 41 is utilized for the purpose. Therefore, an air circulation suction port 102 is provided in one of the vertical frame panels 47, herein the one located at the left side of the cabinet adjacent to the reflector trough and of a size to pass a substantial volume of air therethrough from the scanning chamber. Leading from the suction port 102 downwardly and rearwardly between the frame panel 47 and the adjacent side wall 9 is a suction duct 103 extending downwardly and rearwardly and communicating with a horizontal suction tube 104 which opens into the intake of a rotary squirrel cage blower 105 located to discharge toward louvers 107 opening through the lower end portion of the chute plate 101 and through a vertical downward partition extension 108 of the chute plate defining the rear of the receiving hopper area. Through this arrangement, cooling air is circulated through the scanning chamber and over and past the lamp 41 and the reflector 42 as a result of suction developed by the blower 105 and the heated air is blown through the louvers 107 to provide the discharged copy sheet propelling and drying air movement as indicated by the directional arrows in FIG. 2A. After the trailing edge of the copy sheet passes beyond the lower end of the chute plate 101, air blown through the louvers 107 in the plate 101 as well as the air issuing through the louvers 107 in the vertical partition 108 acts on the upper side of the sheet to force it downwardly onto a receiving plate 109. It will be observed that the series of louvers 107 terminates a substantial distance above the innermost end of the receiving plate 109 so that as the rear end of the copy sheet drops below the series of louvers, press-down action of the air pushing through the louvers accelerates piling of the sheet toward the receiving plate. To facilitate removal of copy sheets from the discharge receptacle, a retractable plate structure 110 may be provided.

Driving of the blower 105 as well as all of the several document original and copy sheet transport rollers is effected by a single electrical motor 111 having a drive shaft 112 extending therethrough and on one end portion of which the blower 105 is directly corotatively mounted. The opposite end portion of the shaft 112 is suitably coupled with a suitable speed reducing gear unit 113 supporting the motor and carried by the adjacent side vertical frame panel 47. A drive shaft 114 of the reduction gear unit carries corotatively a driving wheel which may comprise a sprocket 115 over which is trained a flexible driving coupling member comprising a chain 117 running drivingly over respective sprocket gears on the several driven transport rollers. At a suitable point, as in the span of the drive chain 117 between the driven rollers 24 and 72, a slack take-up idler 118 is desirably provided. Through this arrangeemnt, all of the driven rollers travel at the same speed in both the document original transport system and the copy sheet transport system.

An electrical circuit is provided (FIG. 4) for controlling operation of the machine. For this purpose, the circuit includes customary power leads 119 adapted to be connected with a suitable source of electrical current. Directly connected in this circuit are the pump motor 90 and the blower and chain drive motor 111, so that when a master control switch 120 is closed the document and copy sheet transport systems and the blower 105 run continuously and the liquid toner 84 is in constant circulation for optimum toner distribution throughout the liquid vehicle and for continuous replenishment of the toner supply in the development tray. Conveniently the master switch 120 is mounted on the front of the cabinet (FIG. 1) for suitable "on" and "off" manipulation.

Operation of the copy sheet feed drive motor 65 is under control of the document to be copied and of the successive copy sheets and the copy sheets control operation of the lamp 41 and the charging device 74. For this purpose, the lamp 41, the feed motor 65 and a power pack 121 for the corona discharge device are connected in the electrical power supply circuit under the control of various trip or micro switches including a normally open switch 122 which is mounted on or adjacent to the document guide plate 22 between the document transport rollers 21 and 25 and has a trip arm 123 disposed in the path of the in-travelling document when it enters the flow or guide path between the plates 22 and 23. Tripping of the actuator 123 by the document, closes the switch 122 and thereby closes the energizing circuit through the feed motor 65 whereby one of the copy sheets 59 is fed into the copy sheet transport system and actuates a two-way control switch 124 (FIGS. 2 and 4) having a trip arm 125 disposed in the path of the copy sheet between the transport rollers 72, 73 and the corona charging device 74. This breaks the circuit through the feed motor 65 and closes a circuit to energize a relay 127 closing normally open switch contacts 128 and completing an energizing circuit through the lamp 41 and the corona discharge power pack 121. The switch 124 remains under the control of the copy sheet until the trailing end of the copy sheet leaves the transport rollers 80 and 81, by provision of a second actuator 129 extending into the path of the sheet on the exit side of the transport rollers 80 and 81 and just above the lead-in lip 83 of the developer tray.

Promptly upon release of the switch actuator 129 from the charged copy sheet, the switch 124 automatically returns to its feed motor circuit closing condition and the feed motor 65 is energized to feed the next succeeding copy sheet from the magazine into the guide throat 71. At the exit from the guide throat and immediately before the copy sheet transport rollers 72 and 73 a trip arm or actuator 130 of a normally closed switch 131 is tripped by the leading edge of the newly fed copy sheet and opens the switch 131 to open the feed motor circuit and deactivate this motor until the shunt around the switch 131 is again closed by closing of the control switch 122 by a document to be copied. For synchronization the distance from the tripping position of the trip arm 123 of the switch 122 to the near side of the scanning aperture 29 in the path of travel of the document is identical with the distance from the engagement position of the trip arm 130 of the control switch 131 and the near edge of the exposure aperture 53. Thereby, automatic synchronization of documents to be copied and corresponding copy sheets is attained for high speed operation. In practice virtually as soon as a document to be copied is returned through the exit 38, the finished copy is delivered into the receiving hopper in the lower front of the machine and in a sufficiently dry condition to be handled immediately.

In order to accommodate various illumination intensity requirements for different types of document copy, a shutter 132 is pivotally mounted adjacent to the scanning mirror 43 and is operable from the front of the machine by means of a lever 133 to modulate the intensity of the image reflected onto the mirror from the scanning aperture 29.

It will be understood that modifications and variations may be effected with out departing from the scope of the novel concepts of the present invention.

We claim as our invention:

1. A machine for producing copies electrophotographically comprising,
    means defining a scanning aperture and including means for transporting a document to be copied across said aperture,
    means defining an exposure aperture and including means for transporting a copy sheet across said exposure aperture,
    illumination means directing scanning light through said scanning aperture,
    an optical system operative to scan the document passing across the illuminated aperture and directing the document image through the exposure aperture,
    means for driving said transporting means,
    and electrical control circuitry including:
        a control switch having actuating means including a trip arm on the entry side of said exposure aperture in the path of movement of the copy sheet for operating the switch to close a circuit energizing said illuminating means and a second trip arm on the opposite side of the exposure aperture in the path of movement of the copy sheet and operable to maintain the illuminating means circuit closed until the trailing end of the copy sheet leaves said second trip arm.

2. A copy making machine having document transport and scanning means, a copy sheet magazine, copy sheet transport and exposure means spaced from said magazine, means for transferring a document image from the scanning means to the exposure means, means for guiding copy sheets from the magazine to said copy sheet transport means; and comprising in combination:
    means for feeding copy sheets from the magazine through said guiding means to said copy sheet transport means and including a drive motor;
    a motor operating electrical circuit having a control switch with an actuator disposed in the path of movement of the copy sheets through said guide means and located just before the leading edge of the copy sheets successively reach said copy sheet transport means to be actuated by the leading edge of each copy sheet fed from the magazine and thereby operating said switch to stop said motor to stop the sheet being fed with its leading edge just short of the transport means;
    said circuit including a shunt around said switch to said motor; and
    a normally open switch in said circuit having an operator disposed in the path of movement of documents in the document transport and to be actuated by respective documents co-related in position with respect to the document scanning means and the position of the leading edge of a copy sheet stopped as aforesaid whereby to close said shunt and activate the motor to advance the copy sheet to the copy sheet transport means to travel through the copy sheet exposure means concurrently with travel of the document through said scanning means.

3. In a copy making machine of the character described:
    means defining a document transporting path and including document transporting means and a scaning aperture;
    a copy sheet magazine supporting copy sheets in a substantially horizontal plane;
    roller means bearing against the sheets in the magazine to feed the sheets one at a time from the magazine in a generally horizontal direction;
    a feed motor operative to drive said feeding roller means;
    an exposure aperture in a plane angular to said magazine plane and having sheet transport means adjacent thereto;
    a motor operating electrical circuit normally operative to effect driving of the motor and thereby said roller means;
    a guide throat extending from said magazine to said transport means to divert the copy sheets from the magazine plane to said scanning aperture plane;
    a normally closed switch having means at the transport end of said throat engageable by the leading edge of each successive sheet to open the switch and stop the motor; and
    a shunt around said switch having a normally open switch with an actuator in the path of movement of documents in the document transport arranged to be actuated to close the normally open switch to affect operation of the motor to continue advancing of a copy sheet which has been stopped with its leading edge adjacent to the copy sheet transport means.

4. In a copy making machine of the character described
    frame means defining a scanning aperture and comprising a bar;
    means for transporting a document past the aperture;
    means for illuminating the document as it passes the aperture; and
    a reflecting surface on said frame bar alongside the aperture to reflect into the aperture light from said illuminating means which would otherwise spread beyond the aperture.

5. A copy making machine according to claim 4, in which said frame comprises respective bars, and reflecting surfaces on said bars disposed to reflect into the aperture light from said illuminating means which would otherwise spread beyond the aperture.

6. In a copy making machine of the character described:
 means defining an aperture comprising a combination bracket and frame piece having a sheet guiding face;
 means for transporting a sheet past said aperture along said face;
 means for directing light onto the sheet passing the aperture;
 a light shielding panel; and
 means on said combination bracket and frame piece mounting an edge of the panel comprising a flange and a slot in said piece alongside said flange and located on the opposite side of said piece from said face and in which said edge of the panel is received.

7. A copy making machine according to claim 6, in which said bracket frame piece has a reflecting surface thereon alongside said aperture to reflect into the aperture light from said illuminating means which would otherwise spread beyond the aperture.

8. In a copy making machine according to claim 7, said bracket and frame piece comprising an extruded metal bar.

9. In a copy making machine of the character described:
 means defining a document scanning aperture;
 means for transporting a document past said scanning aperture;
 means for illuminating the document passing said scanning aperture;
 means providing a copy sheet aperture having a plurality of bracket frame pieces with sheet guiding faces and slots opening from the opposite side of the pieces from said faces;
 means for transporting a copy sheet along said guide faces and past said copy sheet aperture; and
 a light tunnel connecting the area of said scanning aperture with said copy sheet aperture and comprising shielding panels having edge portions retainingly engaged in said slots.

10. A copy making machine according to claim 9, in which said bracket frame pieces comprise extruded bars.

References Cited

UNITED STATES PATENTS

| | | |
|---|---|---|
| 2,033,290 | 3/1936 | Landrock. |
| 2,328,847 | 9/1943 | Place. |
| 2,461,185 | 2/1949 | Schubert. |
| 3,044,386 | 7/1962 | Limberger _____ 95—77.5 |
| 3,091,169 | 5/1963 | Taini _____ 95—75.5 |
| 3,263,649 | 8/1966 | Heyl _____ 118—637 |

JOHN M. HORAN, Primary Examiner

U.S. Cl. X.R.

355—50

PO-1050
(5/69)

UNITED STATES PATENT OFFICE
CERTIFICATE OF CORRECTION

Patent No. 3,476,479          Dated November 4, 1969

Inventor(s) Emil Tiger, Erskine G. Corman, Kenneth R. Reick

It is certified that error appears in the above-identified patent and that said Letters Patent are hereby corrected as shown below:

Col. 4, line 41, "providede" should read --provided--.

Col. 4, lines 68 and 69, delete "exposed aperture 53 with the sensitized surface of the sheet".

Col. 4, line 71, "coply" should read --copy--.

Col. 6, line 39, "arrangeemnt" should read --arrangement--.

SIGNED AND SEALED
APR 28 1970

(SEAL)
Attest:

Edward M. Fletcher, Jr.
Attesting Officer

WILLIAM E. SCHUYLER, JR.
Commissioner of Patents